United States Patent

Wise et al.

[11] Patent Number: 5,418,038
[45] Date of Patent: May 23, 1995

[54] SPACE FILLING DEVICE

[76] Inventors: Frederick M. Wise, P.O. Box 849, Arvada, Colo. 80001; Ray Sainz, 3224 Bryant St., Denver, Colo. 80211; Carl F. DeWitt, 9340 Raleigh Ct., Westminster, Colo. 80030

[21] Appl. No.: 118,990

[22] Filed: Sep. 9, 1993

[51] Int. Cl.$^6$ ............................................. B32B 9/00
[52] U.S. Cl. ................................... 428/192; 428/12; 428/47; 428/58; 428/59; 428/66; 428/58; 428/95; 428/119; 428/126; 410/43; 410/52; 410/69; 410/77; 410/94; 410/104; 410/106; 410/129; 410/130; 410/156
[58] Field of Search ................ 428/12, 120, 124, 126, 428/88, 95, 47, 58, 59, 66, 192; 410/43, 106, 94, 129, 52, 156, 69, 77

[56] References Cited

U.S. PATENT DOCUMENTS 4,363,579 12/1982 Rogers ............................... 410/154
5,132,156 7/1992 Trassare, Jr. et al. .............. 428/116

Primary Examiner—Patrick J. Ryan
Assistant Examiner—Abraham Bahta
Attorney, Agent, or Firm—Timothy J. Martin

[57] ABSTRACT

A space filling device for use in a container for cargo shipment to prohibit shifting of the cargo is formed by flat first and second panels, with first and second slots formed in each so that, when assembled, an x-shaped structure is formed. When placed in the container, respective end edges of the panels are supported on the bed of the cargo container while the other of the panels' end edges engage the container's sidewalls. The panel side edges form a pair of x-shaped bases which serve to support the cargo against movement toward the end wall of the container. An anti-slip element may be included on the respective end edges, braces may engage the panels proximate respective end edges, and panel side edge guards may be included to prevent undue wear on the cargo. An auxiliary bearing penal may also be used adjacent at least one of the x-shaped bases. A plurality of x-shaped structures may be utilized in the present invention, with a corresponding plurality of bearing panels interposed between the x-shaped structures.

20 Claims, 6 Drawing Sheets

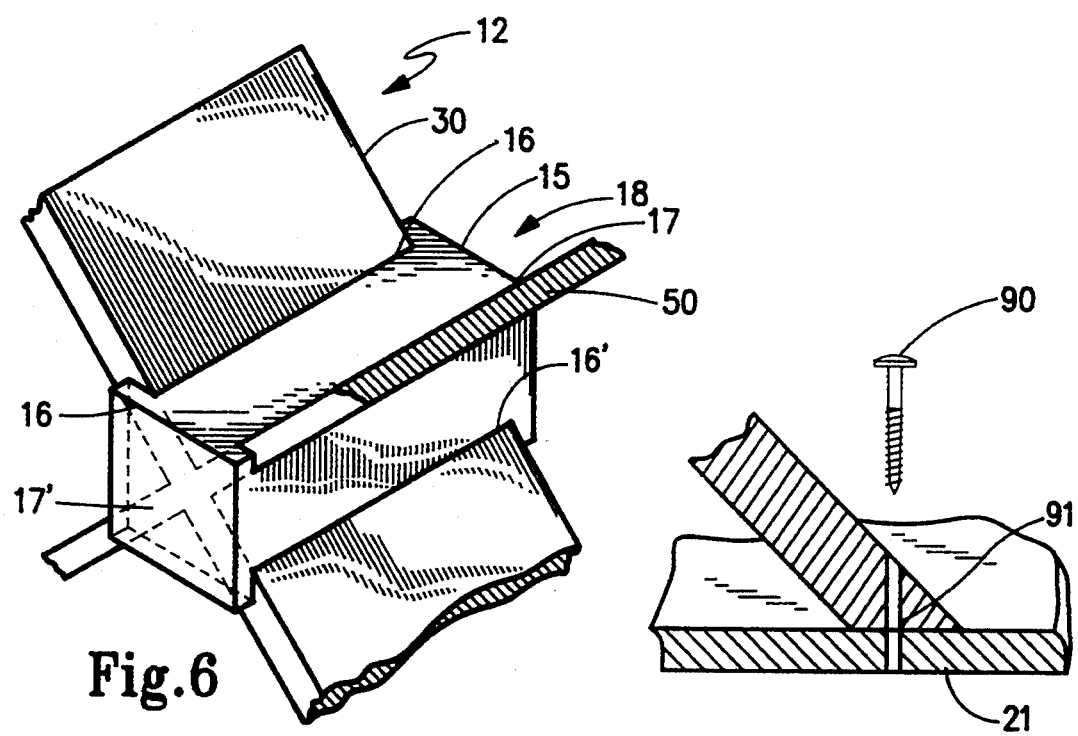
Fig.6
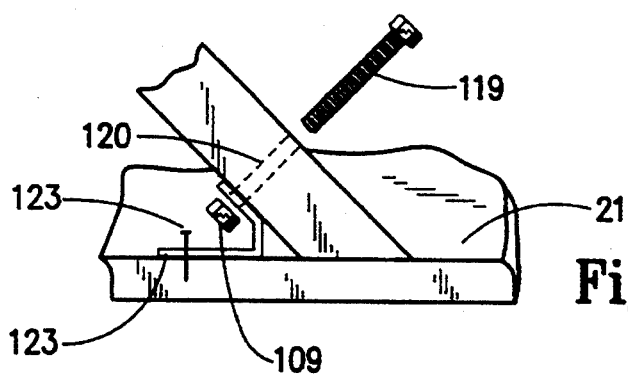
Fig.8a
Fig.8b
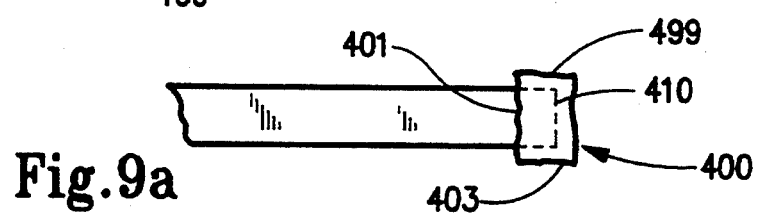
Fig.9a
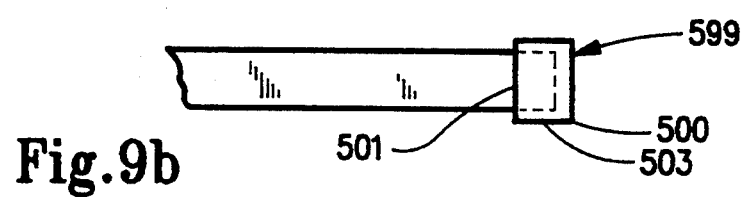
Fig.9b
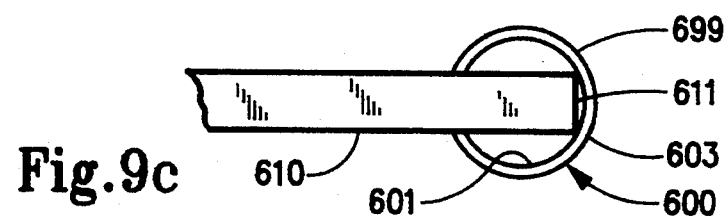
Fig.9c

SPACE FILLING DEVICE

FIELD OF THE INVENTION

The present invention relates generally to a device which is employed to prevent cargo, which is being transported, from shifting during transit. More specifically, the present invention relates the field of lightweight, space filling devices which can be placed into a standard cargo container to occupy a large volume and restrain large masses or heavy cargo from movement within the cargo container, especially movement along the direction of travel of the cargo container. In particular, the present invention concerns large void fillers to be disposed in semi-truck trailer to prevent longitudinal shifting of cargo transported therein.

BACKGROUND OF THE INVENTION

Industrialized countries rely upon transportation systems such as over-the-road trucks, trains, airplanes and boats for distribution and transportation of both large objects and bulky commodities. It is important to the safety of the transportation vehicle, whether it be a truck, car, boat or train, and to the safety of the cargo that the transported cargo is stabilized while being transported. If cargo shifts during transport, the cargo can be damaged and the inside of the cargo container can be damaged. Further, if the cargo is not sufficiently stabilized to avoid shifting, the cargo can unbalance the vehicle and create a dangerous situation. For example, if a vehicle is loaded so that the cargo is distributed evenly between the wheel base of the cargo container and the cargo slips forward while the vehicle is traveling downhill, the shifting cargo can cause the vehicle to lose control and often results in flipping the vehicle over.

To avoid cargo shifting, cargos are packed as carefully as possible in the container to eliminate any open spaces within the cargo to minimize the possibility of the cargo shifting. In many circumstances, however, the weight of the cargo or the nature of the cargo and the size of the cargo container in which it is to be packed is such that open spaces within the cargo container cannot be eliminated. This is especially true where the cargo is heavy, as many vehicles are restricted by weight as to the amount of cargo that they can carry. In order to fill the open regions that remain in the cargo container, it is desirable to provide some type of restraining device or spacing device between the cargo and either the front wall or the back wall or the side wall of the cargo container. These devices have to be constructed to withstand the shifting forces typically encountered during transport. Likewise, they must be relatively lightweight and preferably capable of retro-fitting into any type of cargo container and not permanently mounted within the cargo container. It is also preferred the space filling devices can collapse or be dismantled into a smaller, more easily manageable size so that they can be removed and stored.

One example of an existing space filling device which is in commercial use for truck trailers is a metal and wood system that is welded into the inside of the trailer. This is used for trucks which haul cans of beverages such as soda and beer. Since the weight of the canned beverage is such that, under some governmental regulations, large semi-trucks cannot be loaded completely. Furthermore, since the beer must be loaded between wheels for balance, void spaces are left between the cargo and both the front and back portions of the trailer. To accommodate this packaging of cargo in the middle of the trailer, metal rails are welded onto the sides of the front and the back of the trailer of the truck. A metal bar has one end inserted in one side rail and a second end inserted in the second side rail so that the bar extends across the cargo container parallel to the end walls. Likewise, a second metal bar is inserted in the back portion of the truck. The bars have large pieces of plywood attached to them. The bars are slid within the rails so that the plywood is secured against the cargo. The bars are then locked into place on the side rails. Although this device does restrain the cargo, this type of a cargo retaining device has some disadvantages. It is costly to install. It is permanent as it requires that the side rails be welded into the side walls of the truck. Many commercial trucking companies do not wish to have permanent side rails welded onto their trucks. Plus, this cargo retaining system is quite heavy as it requires metal side rails, metal bars and plywood for restraining the cargo. The weight added by the space filling device reduces the cargo weight which can be hauled.

Although the above space filling device is suitable for use in retaining cargo for shipment, it is generally more complex to use and more permanent than is desirable. Accordingly, there remains a need for an improved space filling device that is lightweight and inexpensive, and that can be retro-fitted into a cargo container without the necessity of permanently affixing rails on the inside of the cargo container.

SUMMARY OF THE INVENTION

It is an object of the present invention to provide a new and useful space filling device that is inexpensive and cost efficient to use.

Another object of the present invention is to provide a space filling device that when assembled can retain heavy cargo but that can be easily disassembled for storage.

Another object of the present invention is to provide a space filling device which does not require permanent attachment to the cargo walls of the container.

Still another object of the present invention is to provide a space filling device having a high strength to weight ratio that resists compressive forces when assembled and placed between the cargo and the cargo container.

Still yet another object of the present invention is to provide a space filling device which is lightweight.

A further object of the present invention is to provide a transportation system consisting of a cargo container and a lightweight, inexpensive space filling device.

According to the present invention, then, a space filling device is provided that is either in a disassembled or in an assembled state. When in the assembled state, the space filling device is adapt to be interposed in a cargo container between the cargo and the end wall thereof. Here, the cargo container has at least, two opposite parallel side walls, an end wall, and a bed. the bed. The space filling device is adapted to inhibit movement of the cargo during transit, especially forward or backward in the direction of travel.

The space filling device broadly includes a first panel and a second panel. Each first panel and second panel has first panel end edges and first panel side edges that extend longitudinally between the first panel end edges to define a width. The first panel has a slot that extends from one of the first panel side edge toward the other first panel side edge at a distance that is less than the width of the first panel. The second panel has a second slot formed therein that extends from one of said second panel side edges to the other of said second panel side edges a distance that is less than the width of the second panel. The first and second panel are operative to mate with one another in the assembled state to form an x-shaped structure when the first slot and second slots are engaged. Accordingly, when in the assembled state within the cargo container, one of the first panel end edges is supported on the bed of the cargo container, and another of the first panel end edges engages a side wall of the container. One of the second panel end edges is supported on the bed of the container, and another of the second panel end edges engages a side wall with said first and second side edges forming a pair of x-shaped bases. Each of the respective x-shaped bases is operative to face and preferably engage either the end wall or the cargo. Thus, the space filling device is operative to inhibit movement of the cargo toward the end wall.

The present invention is a cargo transportation system adapted to hold cargo during shipment. This cargo transportation system includes a container having a bed, a pair of spaced-apart, parallel sidewalls defining a container width therebetween and at least one end wall extending transversely between the sidewalls. The container has an interior which is operative to hold the cargo with the cargo disposed on the bed. The cargo transportation system also includes an x-shaped structure sized and adapted to be disposed between the cargo and the end wall. The x-shaped structure including a pair of flat panels each having a pair of opposite side edges defining a panel width therebetween and a pair of opposite end edges defining a panel length therebetween. The panel length is greater than the container width. Each of said panels having a slot formed in the panel. The slot extends from one of the first panel side edges toward another of the first panel side edge a distance less than the width of the respective panel. The panels being releasably joined to one another along a vertex by engagement of the slots. Whereby, when the x-shaped structure is disposed in the interior of the container, a first end edge of each of the panels is supported on said bed at a junction thereof with a respective sidewall. Additionally, a second end edge of each of the panels is supported against a respective sidewall at a location above the bed. The first side edge of each said panel forms a first x-shaped base, and a second side edge of each panel forms a second x-shaped base. The first x-shaped base is adapted to be positioned facing the cargo with the second x-shaped base facing the end wall whereby the x-shaped structure forms a beam section along the vertex. The beam section is operative to resist compressive forces between the cargo and the end wall.

More particularly, when in the assembled state, the first panel end edge and the second panel end edge that are supported on the bed of the cargo are located proximate the respective intersection of the bed and the side wall of the cargo container. To protect the cargo when the space filling device is in the assembled state, the side edges of the first and second panel can contain edge guards that can extend the length of the side edges, whereby the forces exerted on the side edges are partially absorbed by the edge guards. Each of the first and second panels can be formed of a unitary piece of panel material respectively. The preferred panel material is lightweight tri-wall corrugated cardboard. Other material can be employed such as corrugated cardboard, plywood, plastic, fiberglass or lightweight metal.

A bearing panel can be interposed between the space filling device and the adjacent surface. The bearing panel has a first bearing surface and an opposite second bearing surface. The bearing panel is most often interposed between the cargo and one of the x-shaped bases formed by the first and second panels. The second bearing surface is in contact with the cargo and the first bearing surface is in contact with one of said x-shaped bases whereby the force exerted by the cargo is distributed throughout the bearing panel.

For large void areas a plurality of space filling devices each having a disassembled state and an assembled state can be employed. Each space filling device is adapted when in the assembled state to be placed adjacent one another and interposed between cargo located in a cargo container and a end wall, two opposite parallel side walls, and a bed of the transportable cargo container to inhibit movement of said cargo during transit. When a plurality of space filling devices are employed a plurality of bearing panels can be located between adjacent ones of the plurality of space filling devices. Each of the plurality of bearing panels having a first bearing surface and an opposite second bearing surface. The bearing panel is interposed between the end wall and a space filling device and between each of the plurality of space filling devices and between the cargo and one of the x-shaped bases of one of the space filling devices. Thus, the force exerted by the cargo is distributed throughout the bearing panels.

These and other objects of the present invention will become more readily appreciated and understood from a consideration the following detailed description of the exemplary embodiments of the invention when taken together with the accompanying drawings in, which:

BRIEF DESCRIPTION OF THE DRAWINGS

FIG. 6 is a perspective view of the first exemplary embodiment of the invention employing an optional joint support element which may be mounted on the intersecting portions of the first panel and the second panel of the space filling device of the present invention when in the assembled state;

FIG. 8(a) and 8(b) show a side view in cross-section of the end edges of a panel of the present invention being alternatively secured to the bed of a cargo container;

FIGS. 9(a) through 9(c) respectively show perspective views of the end edge of a panel having an optional side edge guard mounted on the side edge of the panel of the present invention;

DETAILED DESCRIPTION OF THE EXEMPLARY EMBODIMENT

The present invention relates to devices which may be used to occupy the region between cargo loads and the end wall of a cargo container which is capable of transporting the cargo. These space filling devices are preferable lightweight, and yet must have sufficient strength to withstand and restrain the weight of the cargo if shifting occurs during transit. The present invention includes several embodiments of a space filling device, including a cargo transportation system, as well as several strengthening braces and panels which assist the exemplary embodiments in cases where there is extreme cargo weight involved.

Figure 1:
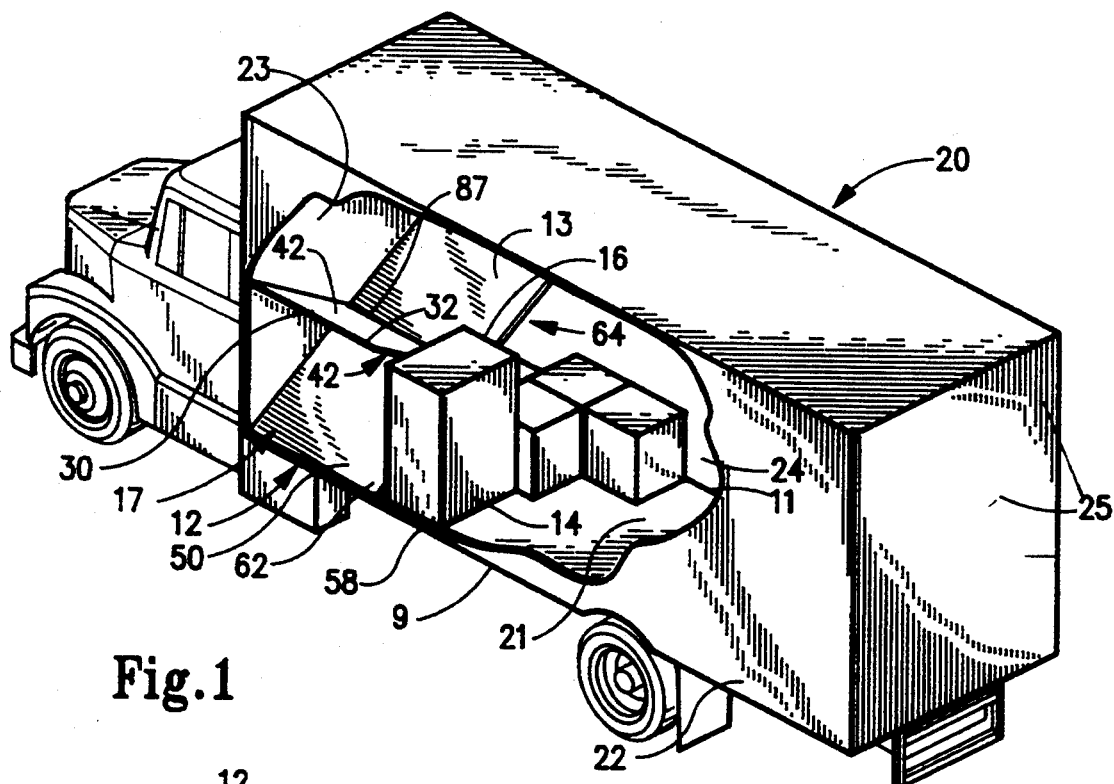
FIG. 1 is a perspective view of a space filling device according to a first exemplary embodiment of the present invention interposed between the end wall of a cargo container and the cargo.

All of the embodiments of the present invention are used to restrain cargo. It should be appreciated, then that the space filling device 12 in FIG. 1 is illustrative of the operational use of all the exemplary embodiments described herein. FIG. 1 shows a tractor trailer rig 10 loaded with cargo 14. The cargo container 20 is shown as a trailer, but it should be understood that the cargo container could be any type of large container adapted to be transported by rail, air or on water. For example, the cargo container could be a railway car or an ocean-going shipping container used in common freighter shipping. In any event, the cargo container 20 has a container interior 27 and has a container bed 21 adapted to support cargo, two opposite end walls 23, 25 and two opposite side walls 22, 24 joined at corners 9, 11 to bed 21. At least one of the end walls 23, 25 extends transversely between the side walls 22, 24, and the side walls 22, 24 which define a container width therebetween. The space filling device 12 is shown interposed in the cargo container 20 between the end wall 23 and the cargo 14 in the open space 13 therebetween. The cargo 14 rests on the cargo container bed 21, and the cargo 14 has a front vertical cargo face 16 that is substantially parallel to end wall 23 and perpendicular to the cargo bed 21.

Figures 2, 3:
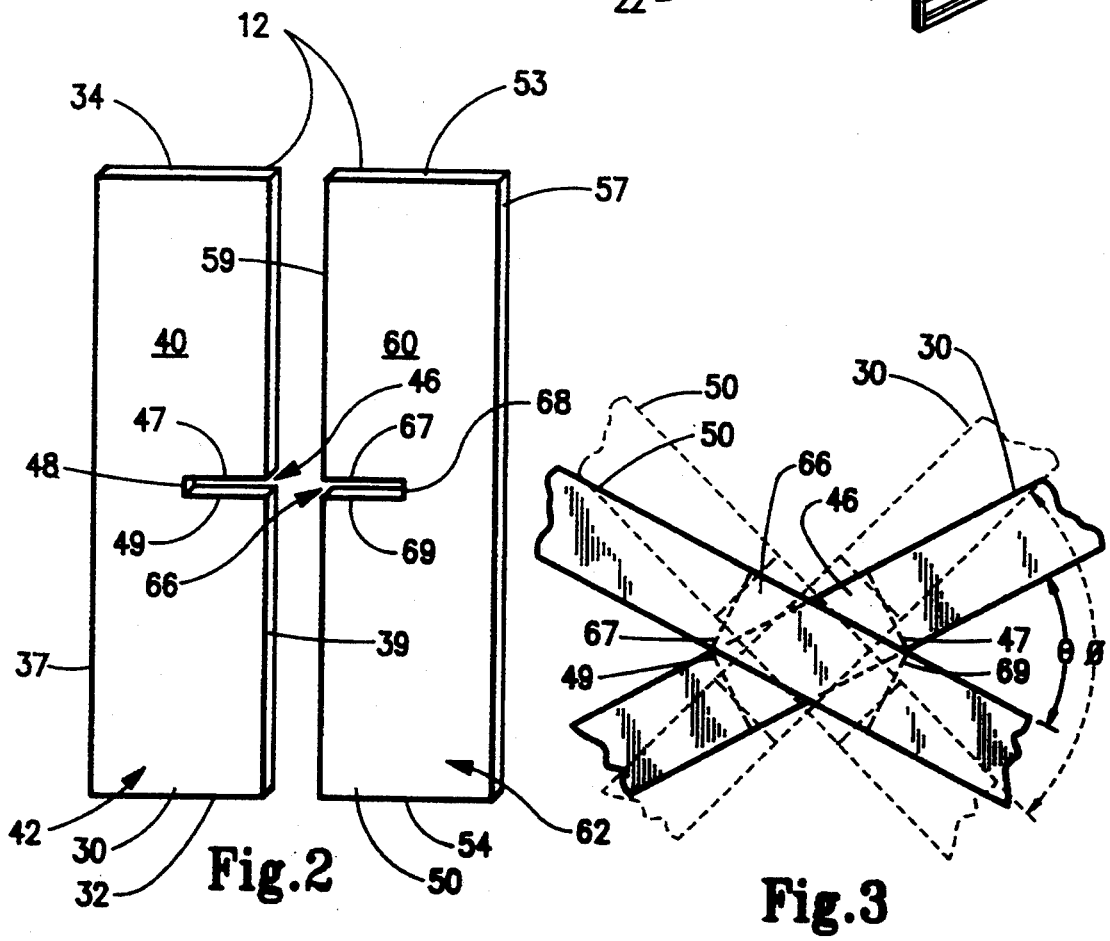
FIG. 2 is a perspective view of a first panel and a second panel of the space filling device shown in FIG. 1 in the dissembled state.
FIG. 3 is a side view in elevation of the intersection of the first panel and the second panel of the first exemplary embodiment of the present invention when in the assembled state.

FIG. 1 shows a first embodiment of the present invention in the erected state formed by a pair of panels 30 and 50 depicted in FIG. 2. First panel 30 and second panel 50, when mated with one another in the assembled state, form an x-shaped structure 17. With reference to FIG. 2, it may be seen that first panel 30 and second panel 50 are each formed as a flat rectangular-shaped panel, each of which have a pair of panel end edges 32, 34 and 53, 54 which defines a length therebetween respectively for panels 30 and 50. Thus, the first panel 30 has first panel end edges 32 and 34 which are located opposite of each other; likewise, the second panel 50 has second panel end edges 53 and 54 which are located opposite each other. The first panel 30 has a mid-portion 40 and first panel side edges 37 and 39 which longitudinally extend between the first panel end edges 32 and 34. The first panel 30 has a first panel front surface 42 and first panel back surface 44 and a thickness therebetween. Similarly, the second panel 50 has second panel side edges 57 and 59 which longitudinally extend between the second panel end edges 53 and 54. The second panel side edges 57 and 59 are located on either side of the second panel's midportion 60. Like the first panel 30, the second panel 50 has a second panel front surface 62 and a second panel back surface 64 defining a thickness therebetween.

Approximate the mid-portion 40 and midway between the first panel end edge 32 and the first panel end edge 34 is the first panel slot 46. The first panel slot 46 is rectangular in shape and extends from the first panel front surface 42 to the first panel back surface 44 through the thickness therebetween. The first panel slot 46 has a first upper slot edge 47 which extends parallel to the first lower slot edge 49 a distance less than the width of the first panel 30. Preferably, the slot 46 extends half way across the width of the first panels 30 between the first panel side edges 37 and 39 and terminates in a back slot edge 48. The first panel slot 46 preferably runs substantially parallel to the first panel end edges 32 and 34.

It may further be seen that the second panel 50 has a second panel slot 66. The second slot 66 extends from the front panel surface 62 through the thickness of the second panel 50 to the back panel surface 64, again preferably half way across the width. Like the first panel slot 46, the second panel slot 66 is rectangular. The second panel slot 66 has a second slot edge 67 and a parallel second lower slot edge 69 and terminates in a second back slot edge 68. The second slot 66 extends from one of the second panel side edges toward the other second panel side edge a distance less than the width of the second panel 50. Again, the second panel slot 66 preferably only extends 50 percent of the way between the second panel side edges 57 and 59 and runs substantially parallel to second panel end edges 53 and 54.

Turning to FIGS. 3(a) and 3(b), the intersection of the slots 46 and 66 of the first panel 30 and the second panel 50 can be clearly seen. The first panel slot 46 and the second panel slot 66 are preferably formed so that the distances between the upper slot edges 47 and 67 and the lower slot edges 49 and 69 are greater than the thickness of either the first panel 30 or the second panel 50. This permits the first panel 30 and the second panel 50 to be positioned at various angles relative to one another when the space filling device 12 is in the erected state. Thus, because the first slot 46 and the second slot 66 are formed to be slightly larger than the thickness of the respective panel, the panels, when in the erected state, can be employed in cargo containers which have a variety of different cargo bed widths. The width of the cargo bed being measured between the cargo side walls.

In the assembled state, the first panel 30 and second panel 50, each converge from their respective first panel end edges 32 and 34 and second panel end edges 53 and 54 to a vertex 87 proximate the mated engagement of slots 46 and 66. It is preferred that the angle between the panels 30 and 50 in the assembled state be in the range of 45° to 135°. It should be thus appreciated that slots 46 and 66 permit the mated engagement of panels 30 and 50. by extending each slot 46 and 66 one half of the width of the respective panel, a first pair side edges, one on each panel, are coplanar to form a first x-shaped base for structure 17. Likewise, the second pair of side edges are co-planar and form an x-shaped base spaced from the first x-shaped base a distance equal to the width of the panels. While it is preferable to make the slots 46 and 66 of equal extension, that is one-half of the panel width, the x-shaped structure 17 can be assembled so long as the combined extension of both slots 46 and 60 equal or exceed the width of the panels.

Figure 4:
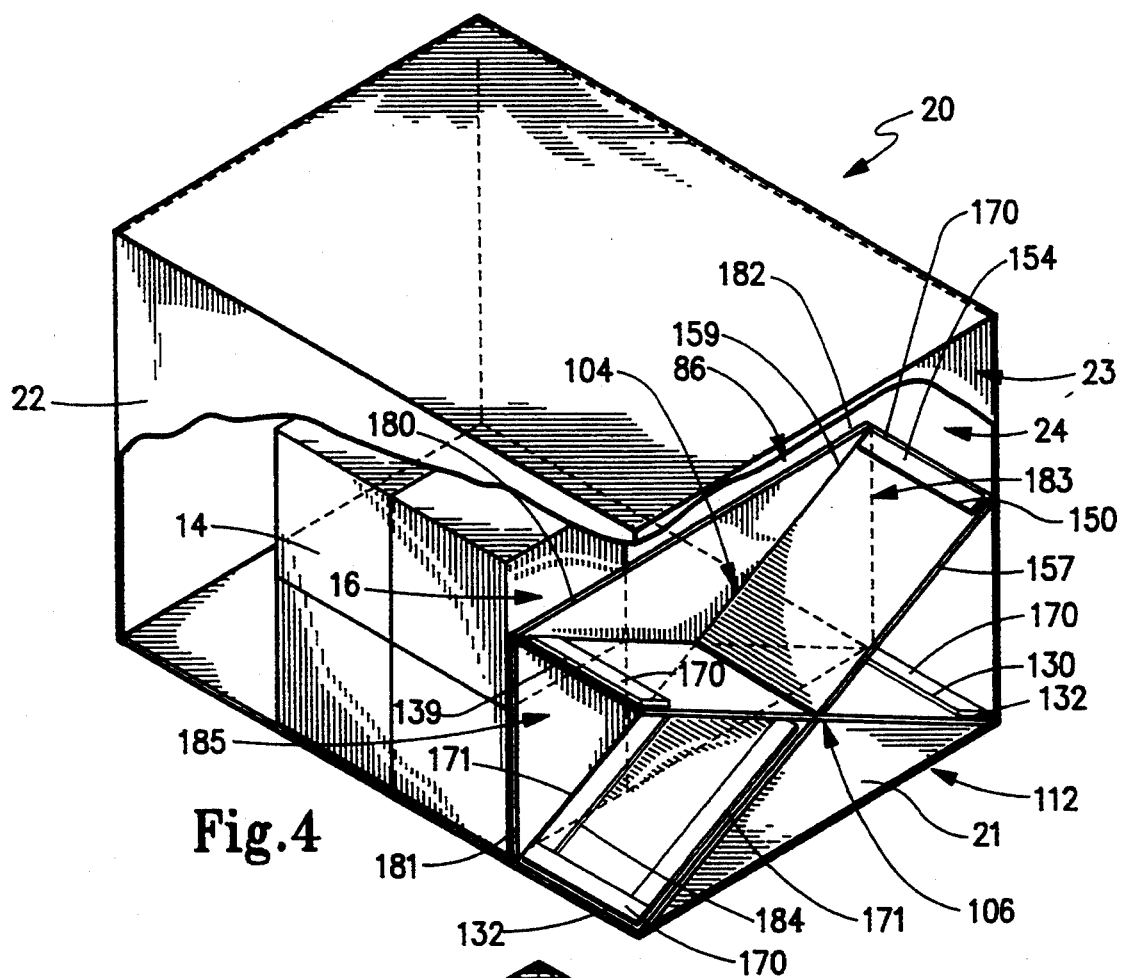
FIG. 4 is a perspective view of the first exemplary space filling device incorporating a bearing panel and end edge reinforcing bars made according to the present invention.

The assembled state of an alternative arrangement of the present invention is shown in FIG. 4. The first panel 130 has a first panel edge 132 that is supported on the bed 21 of cargo container 20. The other first panel end edge 134 engages the side wall 22 of cargo container 20. Likewise, one of the second panel end edges 152 is supported on the bed 21 of the cargo container 20, and the other of the second panel end edges 154 engages the other side wall 24 of the cargo container 20. The first side edge 137 and the second side edge 157 form an x-shaped base 106 that faces the end wall 23 and is operative to engage the end wall 23 of the cargo container 20. Likewise, the first side edge 139 and the second side edge 159 form an x-shaped base 104 that faces the cargo and is operative to engage the cargo 14 and specifically the front vertical face 16 of the cargo 14 to inhibit movement of the cargo 14 towards the end wall 23.

The alternative embodiment shown in FIG. 4 includes end edge reinforcing bars 170 and side edge bar 171. The side edge bars 171 can be used with bars 170 or without. Side edge bars 171 are mounted proximate one or all of the side edges of the respective panels. The reinforcing bars 170 are preferably located proximate the respective end edges of the respective panels 30, 50. The reinforcing bars 170 can be formed of wood, plastic, metal or other strengthening material. The preferred reinforcing bar 170 is formed of one foot by four feet of wood. These reinforcing bars 170 act to prevent buckling of the x-shaped structure which can occur if significant compressive forces are exerted thereon. The reinforcing bars 170 can be mounted on the panels by adhesive or with screws or nails or the like.

The alternative embodiment shown in FIG. 4 also includes a bearing panel 180 which can be interposed between the x-shaped base 106 and the end wall 23 of the cargo container 20 or between the cargo 14 and the x-shaped base 104 of space filling device 112 as shown in FIG. 4. The bearing panel 180 has side edges 181 and 183 that are substantially parallel one to another and substantially parallel with the side walls 22 and 24 of the cargo container 20. The bearing panel 180 also has end edges 182 and 184. The side edges 181 and 183 and end edges 182 and 184 form a perimeter around bearing panel 180. The bearing panel 180 also has a front panel surface 185 and the back panel surface 186, forming a rectangular shape. It should be noted the bearing panel 180 could have a variety of geometric shapes selected depending on the geometric configuration of the front cargo face 16.

Figure 15:
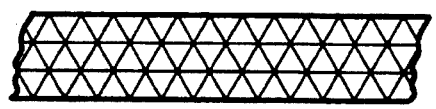
FIG. 15 is an end view of an edge of a panel showing a tri-wall corrugated cardboard construction.

The bearing panel and the panels are preferably formed of similar material. A high strength to weight ratio is gained by using tri-wall corrugated cardboard such as that shown in the edge view of a panel in FIG. 15. Other lightweight material which can withstand the cargo weight can be employed. For example, lightweight metals such as aluminum and alloys thereof and fiberglass, plastics and the like can be employed to form the present invention.

Cargo is often stacked within a cargo container in such a manner that there are void spaces between the walls of the cargo container and the cargo. Similarly, if the cargo is palletized there is often void spaces between the pallets of cargo. Thus, resulting in a front face of the cargo which is not uniformly solid but instead has void areas therein. One of the x-shaped bases of the present invention when in the erect state is adapted to engage and restrain the front cargo face. When there are voids in the cargo face 16, there are portions of the x-shaped base which are not engaging the cargo. These open areas in the cargo face may cause uneven stress points on the x-shaped base of the space filling device which faces the cargo.

To evenly distribute the force exerted by the cargo on the x-shaped structure, a bearing panel can be interposed between the space filling device and the cargo. Similarly, the end wall of the cargo container can have an uneven surface such that only a portion of the x-shaped base of the space filling device engages the end wall. To prevent undue wear of the x-shaped base, a bearing panel may be interposed between the end wall and the x-shaped based of the x-shaped structure (see FIG. 14, for example).

However, as is shown in these figures, it may be appreciated that the space filling device when in the assembled state conforms to the shape dictated by the width of the cargo bed as the panels 30 and 50 are of greater length then the width of the bed. The width of the cargo bed 21, i.e., the distance between the side walls 22 and 24 of a typical cargo container 20 is usually between seven and eight feet. Thus, the length of the panels between the respective end edges can be standardized and used for most containers, particularly for most tractor-trailer applications. The depth of the open space 13 between the end wall 23 and the cargo 14, may of course, vary. To maintain a lightweight space filling device, the width of the panels is preferably not more than seven feet between the respective side edges.

Figure 5:
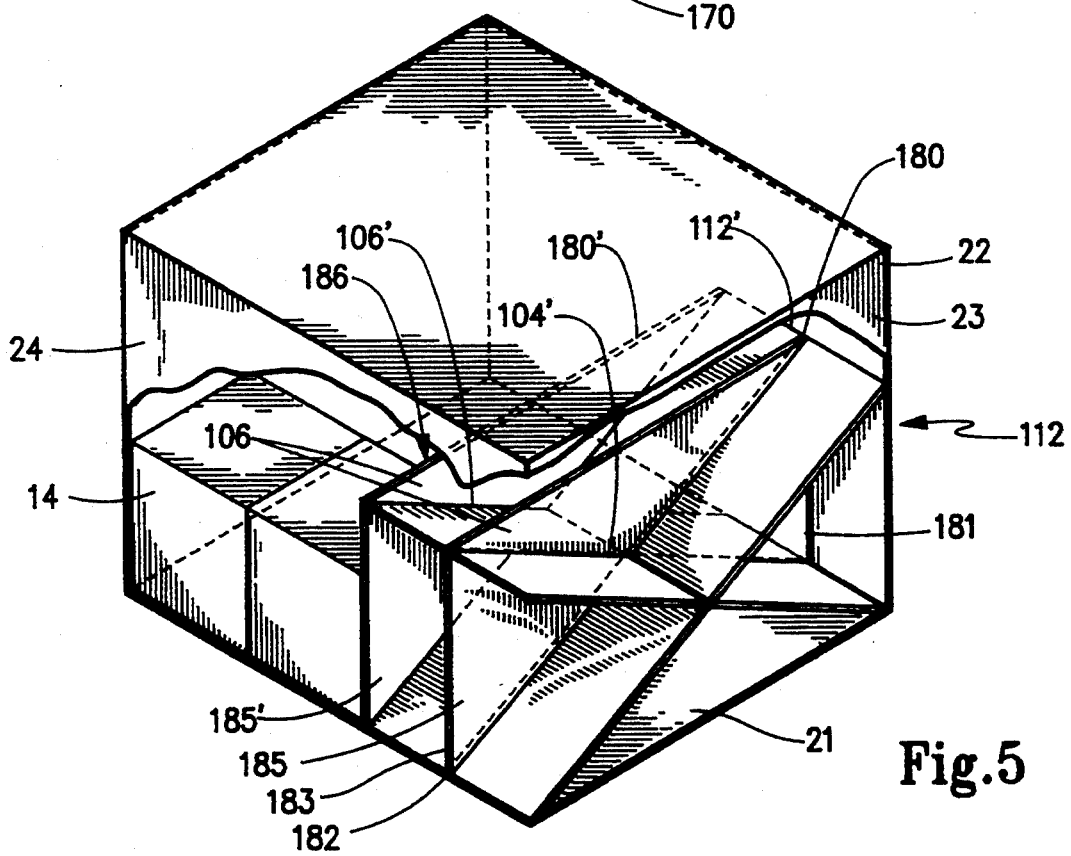
FIG. 5 is a perspective view of a plurality of space filling devices made according to the present invention which are interposed between the end wall of a cargo container and the cargo and which have bearing panels associated therewith.

In FIG. 5, it can be seen that a plurality of space filling devices can be employed. If the longitudinally extending open space 13 between the end wall 23 and the cargo 14 is substantially more than seven feet, then a plurality of space filling devices 112 can be interposed between the end wall 23 and the cargo 14. Preferably, these devices have a bearing panel 180 interposed between one x-shaped base of the first space filling device and the x-shaped base of the second space filling device 112 such that there is an even distribution of the forces exerted on each space filling device 112.

Figure 14:
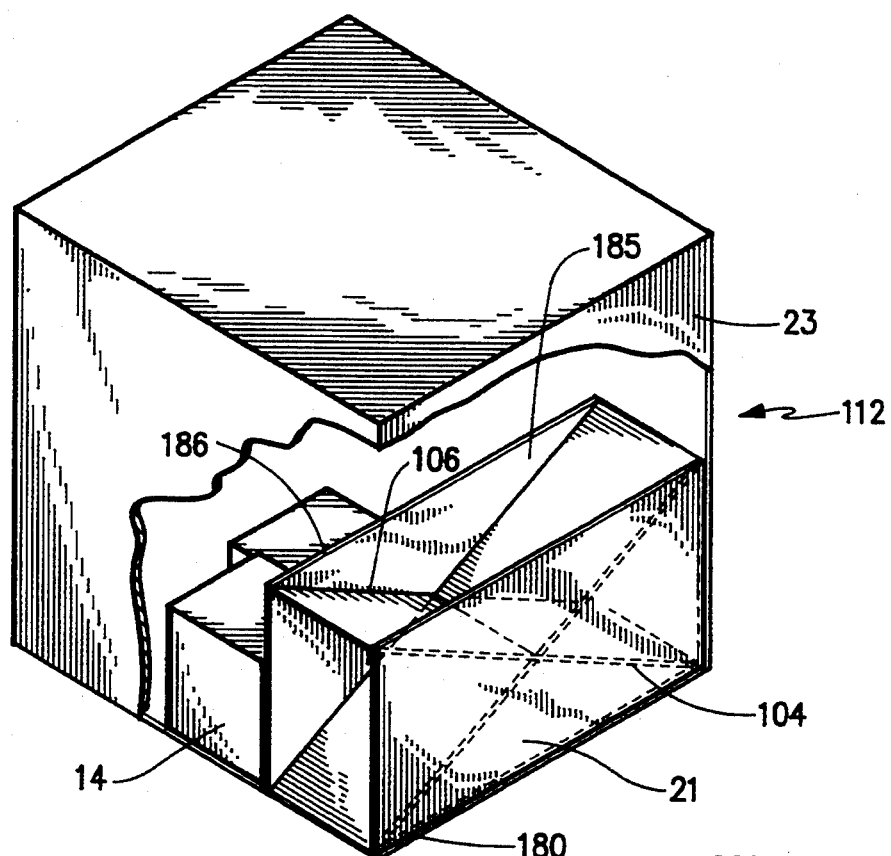
FIG. 14 is a perspective view of the present invention including a pair of bearing panels.

As is clearly shown in FIGS. 4, 5 and 14, the bearing panel 180 is adapted to extend substantially across the cargo bed 21 to cargo side walls 22 and 24 such that the bearing panel side edges 181 and 183 are located proximate cargo side walls 22 and 24. The front bearing panel 180 has one end edge 182 that is located proximate the cargo bed 21. The front panel surface 185 is adapted to contact the x-shaped base 106 and the back panel surface 186 of the bearing panel 180 is adapted to engage front face 16 of cargo 14.

In FIG. 5, it can be seen that the bearing panel 180 can be interposed between the x-shaped base 106 of a first space filling device 112 and between the x-shaped base 104 of a second space filling device 112'. Additionally, a second bearing panel 180' can be interposed between the x-shaped base 106' of the second space filling device 112' and the cargo 14. Alternatively, as shown in FIG. 14, another bearing panel 180 can be interposed between the end wall 23 and the front x-shaped base 104 of the space filling device 112. More specifically, the front panel surface 185 of bearing panel 180 engages the x-shaped base 106 with side edges 181 and 183 located proximate cargo side walls 22 and 24. The second bearing panel 180 shown in FIG. 5 is interposed between the two space filling devices 112 and 112'. Again, side edges 181 and 183 of bearing panel 180 are located proximate and parallel to cargo side walls 22 and 24. The x-shaped base 104 of space filling device 112 is in contact with the front panel surface 185 of the bearing panel 180. The back panel surface 186 of the bearing panel 180 is in contact with the space filling device 112' and more specifically the front x-shaped base 104'. The end edge 182 of bearing panel 180 is substantially parallel to cargo bed 21. Bearing panel 180' is interposed between cargo 14 and space filling device 112' such that the front panel surface 185' of bearing panel 180 engages the x-shaped base 106' of the space filling device 112' and the back panel surface 186' of bearing panel 180' engages the cargo 14. Thus, a plurality of space filling devices can be employed to restrain cargo. The use of multiple space filling devices permits each individual space filling device to remain compact and lightweight, therefore being easily assembled and disassembled.

An option joint support element 15 is shown in FIG. 6. The joint support element 15 is adapted to be mounted on first panel 30 and second panel 50 to strengthen and stabilize the interconnection between the two panels when the space filling device is in the assembled state. The joint support element 15 is tubular in shape with a square-shaped cross-section. Each longitudinal corner is cut-away to provide a channel to receive the thickness of the respective panel. A cap 16 is removably secured to the open mount of element 15 so that when the space filling device 12 is in the erect state, the joint support 15 element can be slidably mounted onto the space filling device 12. Channels 16 and 16' engage the first panel 30. Channels 17 and 17' engage the second panel 50. After the joint support element 15 is mounted onto the space filling device 12, cap 16 can be snap-fit onto the end of the joint support element 15 to stabilize the intersection of the two panels. Preferably, the cap element only projects slightly, if at all, outwardly of the first and second side edges of the respective panels. Opposite the cap 16 is a flat end surface 18 which interconnects the channels 16, 16', 17, and 17' one to another.

Figure 7A:
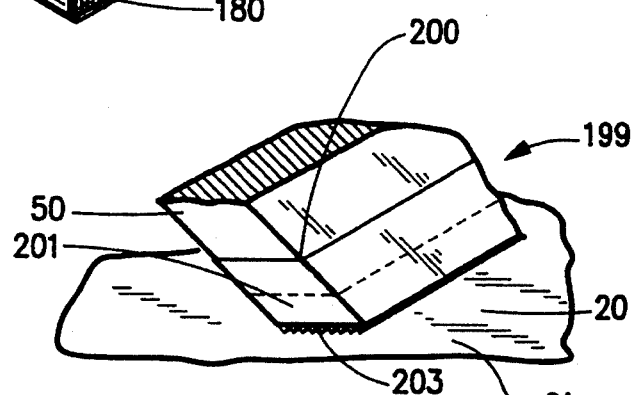
FIGS. 7(a), 7(b), and 7(c) respectively show perspective views of a portion of an optional anti-slip element adapted to be mounted on the end edges of the first and second panel of the present invention when in the assembled state.
Figure 7B:
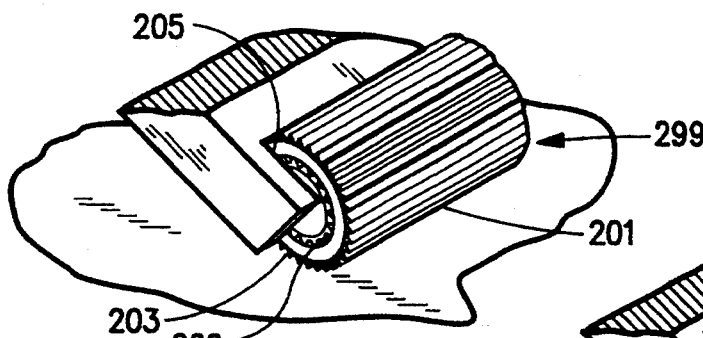
Figure 7C:
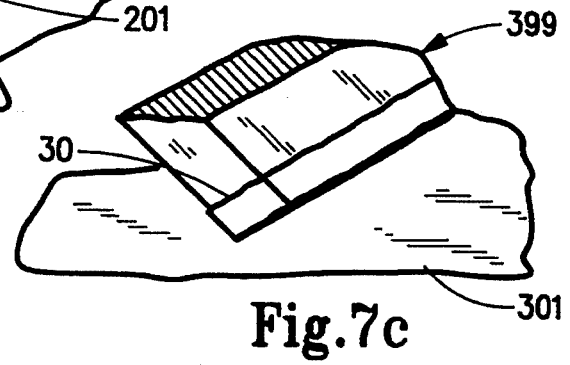

FIG. 7(a) through 7(c) show anti-slip elements which can be mounted or securely attached onto the end edges of the respective panels. The anti-slip element can have a variety of structural configurations. The structure can be a channel structure such as shown in FIG. 7(a) or a tubular structure as shown in FIG. 7(b) or a coated structure as shown in FIG. 7(c) to name a few. FIG. 7(a) shows a clip-like channel structure adapted to cover the end edges and a margin portion of the front surface and back surface of the respective panel. This anti-slip element 199 is preferably formed of a high friction material. As is shown in FIG. 7(a), the anti-slip element has an open channel interior 200 adapted to retain the end edge of the panel, and a channel exterior 201 adapted to engage the interior 101 of the cargo container 20. The channel exterior 201 can have a tread or traction structure 203 that prevents slippage when the space filling device is in the assembled state and engaging the walls and bed of the cargo container 20. It should be noted that the anti-slip element can be placed on both end edges of the respective panels or alternatively can be placed only on the one end edge that is adapted to engage the cargo bed 21.

FIG. 7(b) shows an anti-slip element 299 that is tubular and is circular in cross-section. This anti-slip element 299 has a tread-like structure both on the interior circumference of open channel interior 200 of the element and on the channel exterior 201 of the element. This anti-slip element 299 is formed out of a material that is sufficiently rigid to maintain its configuration on the end edge. The channel ends 203 and 205 respectively frictionally engage the margin portion of the panel proximate the end edge.

FIG. 7(c) shows an end edge that has been dipped in polymeric material to coat the end edge. This anti-slip element 399 also has a channel with a channel interior 300 and a channel exterior 301. The channel operates both to prevent slippage and as an edge guard such that the movement of the vehicle does not cause wear on the end edges of the panels.

It is preferred that the space filling device is not permanently attached within the cargo container, as it is desirable to be able to retrofit any trailer or cargo container with a space filling device. In some instances, though, it may be necessary or desirable to have the space filling device removably secured to the cargo bed 21 of the cargo container 20. FIG. 8(a) shows a screw 90 adapted to be placed in bore 91 that extends through an end edge of a panel and into the container 21. Thus, the screw 90 can be mounted into a portion of the cargo bed 21 such that the end edge of the space filling device is secured to the cargo bed 21. Bores can be drilled along the length of the end edges as needed. FIG. 8(b) likewise shows a method of securing the end edge of the space filling device to the cargo bed 21 of the container 20. In FIG. 8(b), a bolt 119 is placed in bore 120 which extends through the thickness of the panel. The bolt 119 is then secured by nut 109 to a mounting structure 123 which is securely mounted onto bed 21 by screw 123.

FIGS. 9(a), 9(b) and 9(c) all show alternative edge guards. Like the anti-slip element, the edge guard can be made in various structural configurations. The edge guards have two functions: (1) to protect the edge (either the side or the end edge) of the panel from undue wear; and (2) to absorb some of the frictional forces encountered by the edge of the space filling device. Any structural configuration that accomplishes these goals can be employed. FIG. 9(a) shows a coated structure similar to FIG. 7(c). FIG. 9(b) shows a clip-on channel structure. FIG. 9(c) shows a tubular structure of the edge guard. FIG. 9(a) shows a panel side edge 410 that has an edge guard 499. The edge guard 499 is formed as a channel 400 having a channel interior 401 and channel exterior 403. The channel 400 is formed by being dipped into a polymeric material somewhat similar to the rubberized material which coats pliers and hammers and other tools.

FIG. 9(b) shows a rectangular shaped edge guard 599 which is formed as a resilient channel 500. The channel 500 has a channel interior 501 and a channel exterior 503. The channel interior 501 is adapted to engage the side edge of a panel. The channel exterior 503 is adapted to engage a surface such as an end wall or a cargo face or a bearing panel while preventing edge wear.

FIG. 9(c) shows a tubular guard 699 which has a substantially semi-circular configuration. Again, the structure has a channel 600 with a channel interior 601 adapted to frictionally engage the margin portion 610 of the edge 611 and a channel exterior 603 which is adapted to engage a surface while preventing edge wear. As noted, these are optional edge guards which can be mounted on any of the embodiments of the present invention.

Figure 10:
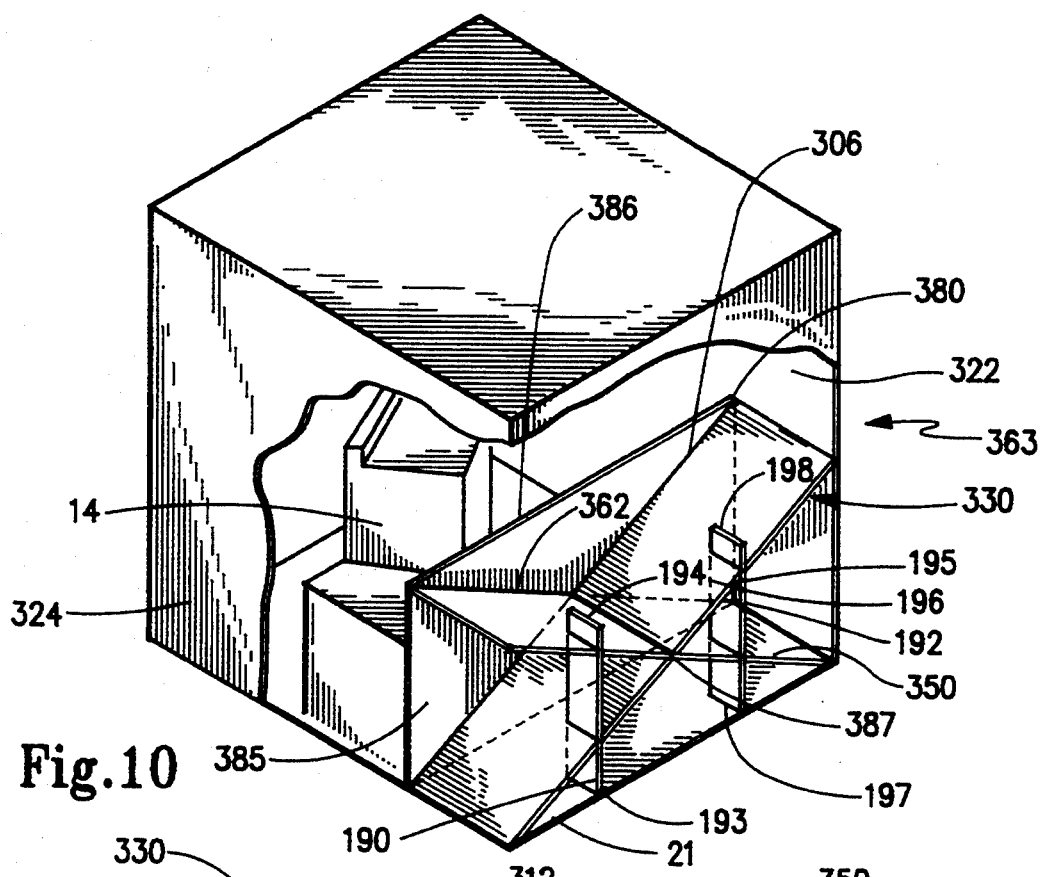
FIG. 10 is a perspective view of a second exemplary embodiment of the present invention showing first and second brace supports mounted thereon.
Figure 11:
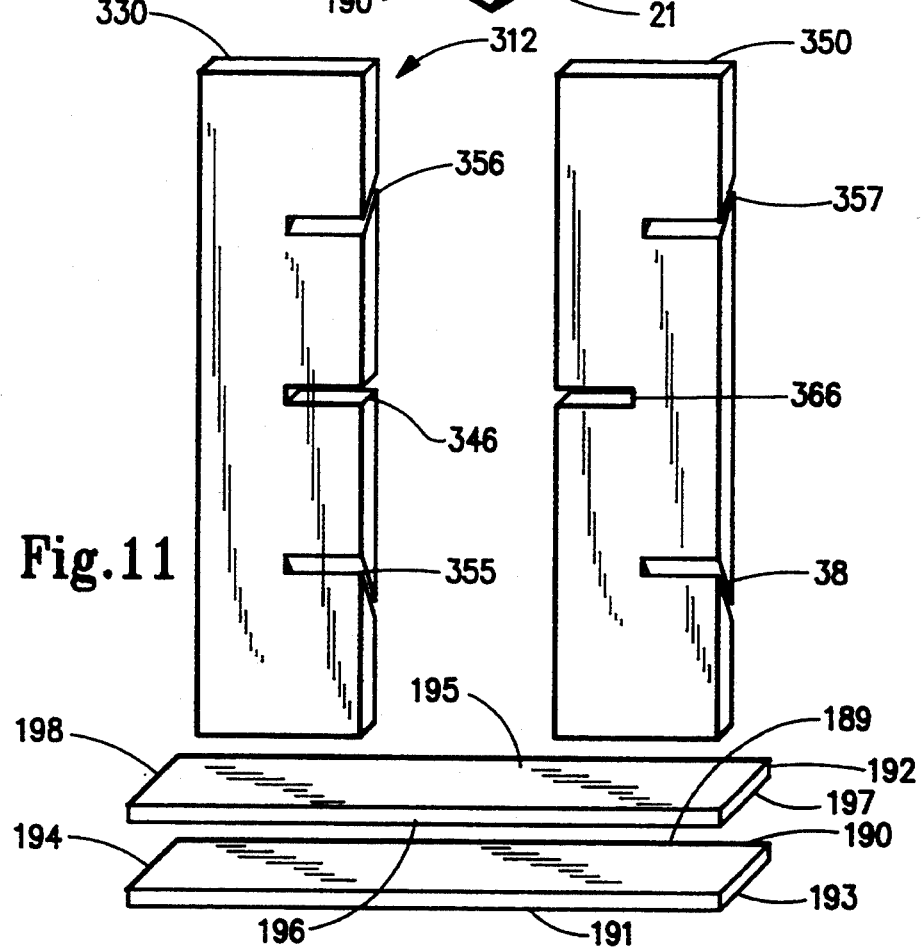
FIG. 11 is a perspective view of the first panel and second panel and the brace supports of the alternative exemplary embodiment of the present invention shown in FIG. 10.

FIGS. 10 and 11 show an alternative embodiment to the present invention. In FIG. 10, the space filling device 312 is shown assembled and in FIG. 11 and the panels forming space filling device 312 are shown dissembled. FIG. 10 shows a space filling device 312 having a first channel 330 and a second panel 350 mateably engaged such that an x-shaped structure 363 is formed. In the assembled state, the first slot 346 is mateably engaged with the second slot 366. The x-shaped base 306 is in contact with the front panel surface 385 of bearing panel 380. The back panel surface 386 of the bearing panel 380 engages the cargo 14. Located one on either side of the vertex 387 is first brace 190 and second brace 192 which are substantially parallel one to another and substantially parallel to side cargo walls 322 and 324. The first brace 190 is formed in a generally rectangular shape having a first brace 191 and 189 side edges and 193 and 194 end edges. Brace end edge 193 is adapted to engage cargo bed 21, and brace end edge 194 is adapted to extend upwardly from the first panel front surface 362 when the space filling device is in the assembled state. Likewise, the second brace 192 has second brace side edges 195 and 196 and end edges 197 and 198. Each of the first panel 330 and the second panel 350 have slots formed therein. These slots are more clearly shown in FIG. 11. FIG. 11 shows that there are slots 355, 356, 357, and 358 formed in both the first panel 330 and the second panel 350 respectively. Likewise, first panel 330 and second panel 350 have slots 346 and 366. The slots 355 and 356 are adapted to mateably engage the first brace 190. Likewise, in panel 350, the slots 357 and 258 are adapted to mateably engage the second brace 192. The braces 192 and 190 are particularly useful when the space filling device 312 is retaining heavy weight cargo as the braces 192 and 190 provide additional resistance to compressive forces exerted by the cargo 14 while in transit.

Figure 12:
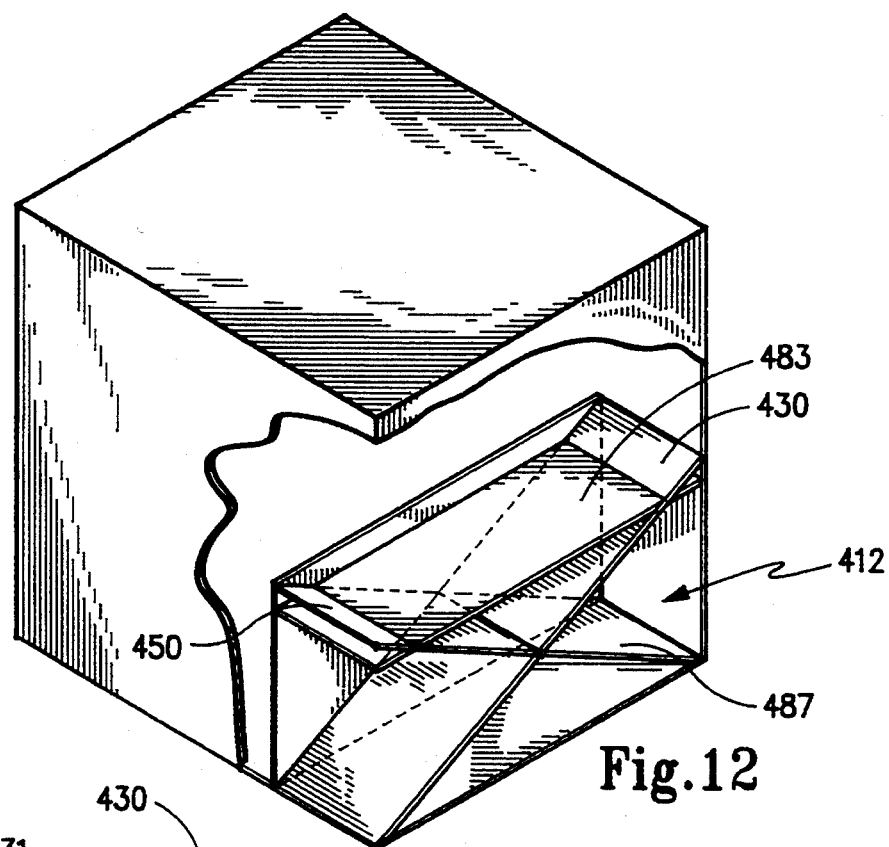
FIG. 12 is a perspective view of a third exemplary embodiment of the present invention showing a top panel mounted to the first and second panels.
Figure 13:
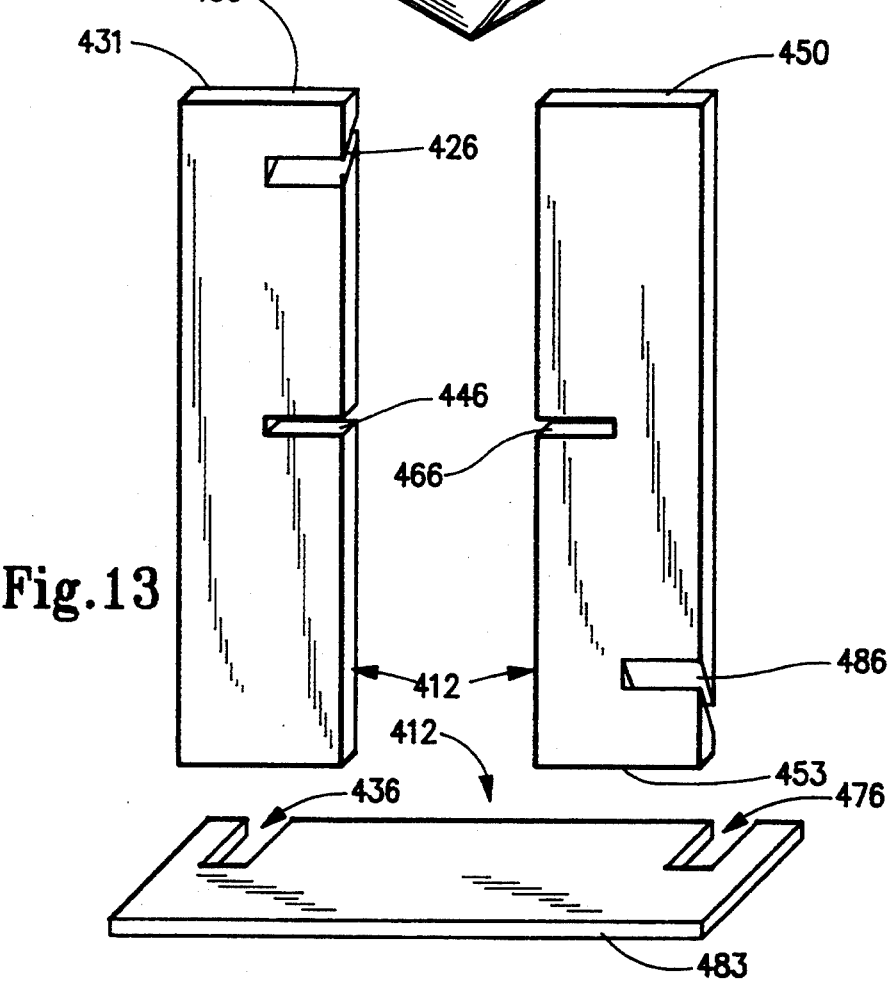
FIG. 13 is a perspective view of the first panel and second panel and the top panel of the third exemplary embodiment of the present invention shown in FIG. 12.

FIG. 12 and FIG. 13 show another alternative embodiment of the present invention. In FIG. 12, the space filling device 412 is in the assembled; in FIG. 13, the panels forming space filling device 412 are shown disassembled. The space filling device 412 is similar to those already described as it has a first panel 430 and a second panel 450 interconnected at a vertex 487 by mateably engaging slots 446 and 466, FIG. 12 also shows a top panel 483 securably mounted by top slots 436 and 476 form in the top panel 483 on to the space filling device 412. The space filling device has a slot 426 formed in first panel 430 and a slot 486 formed in second panel 450 proximate end edges 431 and 451. Slots 426 and slot 486 are adapted to mateably engage top slots 436 and 476 respectively of top panel 403. Although not shown an additional bottom panel could be inserted parallel to the top panel 403 but on the opposite side of the vertex 487. Like the braces 190 and 192 the top panel 483 functions to assist the space filling device 412 to resist and inhibit cargo movement.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

We claim:

1. A space filling device having a disassembled state and an assembled state and adapted in a cargo container that has an end wall, two opposite parallel side walls defining a container width therebetween, said space filing device adapted in the assembled state to be interposed between cargo placed in said container for shipment and said end wall to inhibit movement of said cargo during transit, said space filling device comprising:

(a) a flat first panel having opposite first panel end edges and defining a length therebetween and having a pair of first panel side edges extending between said first panel end edges and defining a first panel width therebetween;

(b) a flat second panel having opposite second panel ends edges and defining length therebetween and having a pair of second panel side edges extending between said second panel ends edges, and defining a second panel width therebetween;

(c) a first slot formed in said first panel and extending from one of said first panel side edges toward another of said first panel side edges a distance less than the width of said first panel; and (d) a second slot formed in said second panel and extending from one of said second panel side edges toward another of said second panel side edges a distance less than the width of said second panel, said first and second panels operative to mate with one another in the assembled state to form an x-shaped structure with said first and second slots engaged, said first and second panels sized and configured whereby, when in the assembled state and placed in said container, said first panel has one of said first panel end edges supported on the bed of said cargo container and another of said first panel end edges engaging a first side wall of said container and one of said second panel end edges supported on the bed of said cargo container and another of said second panel end edges engaging a second side wall with said first and second side edges forming a pair of x-shaped bases, one of said x-shaped bases facing said end wall and another of said x-shaped bases facing said cargo, said x-shaped bases operative to support the cargo against movement toward said end wall.

2. A space filling device according to claim 1 wherein said first panel and said second panel when assembled form a vertex proximate the first and second slots and each of said first and wherein second panels when in the assembled state is formed by a pair of first and second panel portions that are symmetric about the vertex.

3. A space filling device according to claim 1 wherein said first and second panels are of substantially common size and shape.

4. A space filling device according to claim 1 including an anti-slip element on each of said first and second panel end edges.

5. A space filling device according to claim 1 including a first brace and a second brace, each of said first and second braces adapted to mateably engage the first and second panels proximate said first and second panels respective end edges.

6. A space filling device according to claim 1 including a pair of first panel side edge guards and a pair of second panel side edge guards that extend along the length of each of said side edges whereby undue wear on the cargo is prevented.

7. A space filling device according to claim 1 wherein each of said first and second panels are formed of a unitary piece of panel material.

8. A space filling device according to claim 1 wherein said panel material is selected from a group consisting of: corrugated cardboard, plywood, fiberglass, plastic, and metals.

9. A space filling device according to claim 1 wherein said panel material is corrugated tri-wall cardboard.

10. A space filling device according to claim 1 including a first bearing panel having a first bearing surface and an opposite second bearing surface, said first bearing panel interposed between said cargo and one of said x-shaped bases formed by said first and second panels such that said first bearing surface of said first bearing panel abuts said cargo and said second bearing surface abuts one of said x-shaped bases whereby said force exerted by said cargo is distributed throughout said first bearing panel.

11. A space filling device according to claim 10 wherein said first bearing panel has opposite first bearing panel end edges and first bearing panel side edges longitudinally extending between said end edges and defining a rectangular shaped first bearing panel.

12. A space filling device according to claim 11 wherein when in the assembled state said first bearing panel is located adjacent at least one of said x-shaped bases and one of said first bearing panel end edges engages said bed of said cargo container.

13. A space filling device according to claim 10 wherein said first bearing panel is of material selected from a group consisting of wood, metal, fiberglass, plastics or cardboard, 14. A space filling device according to claim 1 wherein said first slot defines a rectangular shape having a pair of first slot edges and a first slot end edge, and said second slot defines a rectangular shape having a pair of second slot edges and a second slot end edge wherein when said space filling device is in the assembled state said first slot end edge and second slot end edge are in contact with one another.

15. A space filling device according to claim 1 including a plurality of said x-shaped structures, each of said x-shaped structures being interposed between said end wall and said cargo in said cargo container.

16. A space filling device according to claim 15 including a plurality of bearing panels interposed between each of said x-shaped structures and the adjacent x-shaped structure wherein one of said x-shaped base of each structure engages one of said bearing panels.

17. A cargo transportation system adapted to hold cargo during shipment, comprising;
   (a) a container having a bed, a pair of spaced-apart, parallel sidewalls defining a container width therebetween and at least one end wall extending transversely between said sidewalls, said container having an interior operative to hold said cargo with said cargo disposed on said bed; and
   (b) an x-shaped structure sized and adapted to be disposed between said cargo and said end wall, said x-shaped structure including a pair of flat panels each having a pair of opposite side edges defining a panel width herebetween and a pair of opposite end edges defining a panel length therebetween that is greater than the container width, each in said panels having a slot extending from one of its side edges toward another of its side edges a distance less than the width of the respective panel, said panels being releasably joined to one another along a vertex by engagement of the slots whereby, when said x-shaped structure is assembled and disposed in the interior of said container, a first end edge of each of said panels is supported on said bed at a junction thereof with a respective sidewall and with a second end edge of each of said panels supported against a respective said sidewall at a location above said bed, a first side edge of each said panel forming a first x-shaped base and a second side edge of each said panel forming a second x-shaped base, said first x-shaped base adapted to be positioned facing said cargo with said second x-shaped base facing said end wall whereby said x-shaped structure forms a beam section along said vertex, said beam section operative to resist compressive forces between said cargo and said end wall.

18. A cargo transportation system according to claim 17 including a joint support element with a plurality of channels, each of said channels adapted to engage one of said first and second channels proximate said vertex.

19. A cargo transportation system according to claim 17 including an edge guard having a channel with a channel interior adapted to mateably engage a side edge of a first and second panel whereby said side edge is protected from wear.

20. A cargo transportation system according to claim 17 including a top panel having a pair of top slots adapted to engage a pair of slots formed in said first and second panels proximate one of said end edge of each respective panel.

* * * * *